INVENTORS
ERWIN K. WELHART
DAVID L. VOSS
JOHN F. HARRELL

BY Gravely, Lieder & Woodruff
ATTORNEYS

United States Patent Office 3,810,815
Patented May 14, 1974

3,810,815
TRANSPARENT LAMINATE
Erwin K. Welhart, Florissant, David L. Voss, Chesterfield, and John F. Harrell, Florissant, Mo., assignors to McDonnell Douglas Corporation, St. Louis, Mo.
Filed July 10, 1969, Ser. No. 840,687
Int. Cl. B32b 27/18, 27/30, 31/20
U.S. Cl. 161—183                              4 Claims

ABSTRACT OF THE DISCLOSURE

A transparent laminate is formed by diffusion bonding at least one layer of acrylic resin sheet to a layer of polycarbonate resin in the presence of heat and pressure so as to form a clad polycarbonate. The bonding may or may not be effected in an evacuated atmosphere.

BACKGROUND OF THE INVENTION

This invention relates in general to transparent material and more particularly to a transparent plastic laminate and a process for forming the same.

Cast polymethyl methacrylate, or acrylic as it is more commonly known, is used extensively as a transparent shielding device where glass is unsafe, too heavy, or otherwise impractical, and this is particularly true of the aircraft industry where acrylic windows and canopies are commonplace, at least on aircraft which operate below about Mach 2.0. Acrylic, which is currently marketed under such trademarks as Plexiglas (Rohm and Haas) and Lucite (DuPont) possesses several characteristics which make it ideally suited for aircraft canopies as well as for other products. For example, it is considerably lighter than glass, yet is quite strong at ambient temperatures. Moreover, while acrylic is relatively soft and therefore scratches more readily than glass, the scratches are easily removed merely by polishing the marred area with common polishing compounds. Furthermore, acrylic is fairly stable from a chemical standpoint, being unaffected by most solvents, and in addition, it accepts ultraviolet light stabilizers without significantly impairing its light transmitting characteristics.

Acrylic, however, loses its strength at elevated temperatures and indeed is almost pliable at temperatures which exceed approximately 230° F. to 250° F. In applications where a temperature gradient exists across the acrylic, such as in the cockpit canopy of a jet aircraft, thicker sheets of acrylic may be used to overcome this problem since thicker sheets spread out the gradient and thus afford a larger cross-sectional portion in a relatively low temperature range. It is this section, of course, which carries the load, or, in other words, rigidifies the sheet, notwithstanding the weakness of the high temperature portion. Increasing the thickness of acrylic aircraft canopies, however, increases the weight of such canopies appreciably, and this is clearly undesirable. Since many of the high performance aircraft currently in production or under development have, or will have, the capability of flying above Mach 2.0, at which speed their skins will reach temperatures between 250° F. and 400 F., acrylic is not suitable for the windows, windshields and canopies of such aircraft. In addition, cast acrylic shatters relatively easy, and therefore is not acceptable for use as protective shields.

Polycarbonate, like acrylic, is light in weight, but in contrast to acrylic retains its high strength even at elevated temperatures in the vincinity of 250° F. to 400° F. Polycarbonate, which is marketed under the trademark Lexan (General Electric), among others, is highly shatter resistant, and for this reason is employed in transparent police shields as well as for building windows in areas where windows are the continual targets of rocks and other hurled missiles.

Polycarbonate, likewise, possesses disadvantages, but those disadvantages are of a different character than those associated with acrylic. One of the primary disadvantages of polycarbonate resides in the fact that the surface molecules or polymer tend to flow with abrasive compounds and consequently scratches cannot be easily polished out of polycarbonate. Moreover, polycarbonate is chemically sensitive to many solvents and, therefore, cannot be used in environments in which such solvents are present. Furthermore, while possessing relatively high strength at elevated temperatures, polycarbonate tends to bubble internally at temperatures in excess of 340° F., and the presence of internal bubbles, of course, destroys its optical qualities. In addition, polycarbonate is formed in an extrusion process which imparts slight microscopic ridges to the surfaces of the sheets and these ridges impair the optical qualities of the sheets. To elimate these ridges the sheets are usually compressed between highly polished platens which in effect press the ridges into the remaining portions of the surface, but this adds appreciably to the cost of the polycarbonate. In this same vein, the ridges tend to reappear at elevated temperatures due to the so-called memory characteristics of polycarbonate. Finally, ultraviolet light stabilizers adversely affect the light transmitting characteristics of polycarbonate. Thus, polycarbonate alone is not completely suitable for use in canopies of high performance aircraft as well as for many other applications.

Heretofore acrylic and polycarbonate sheets have been adhesively bonded to one another, but the laminates so formed have possessed poor optical qualities due to the presence of the adhesive.

SUMMARY OF THE INVENTION

One of the principal objects of the invention is to provide a transparent laminate having the advantages of both acrylic and polycarbonate resins, but being free of most of the defects possessed by those resins individually. Another object is to provide a transparent laminate which is suitable for use in windows, windshields and canopies of aircraft capable of achieving high speeds and high skin temperatures. A further object is to provide a transparent laminate from which scratches can be removed easily by polishing, and which is not appreciably affected by solvents. Yet another object is to provide a transparent laminate which possesses high strength and is shatter resistant, yet is light in weight. An additional object is to provide a process for producing a transparent laminate of the type stated. Still another object is to provide a process of the type stated which is simple and does not require costly equipment. These and other objects and advantages will become apparent hereinafter.

The present invention is embodied in a transparent laminate comprising layers of acrylic sheet and polycarbonate resin diffusion bonded to one another. The invention further resides in a process for diffusion bonding the layers through the application of heat and pressure. The invention also consists in the parts and in the arrangement and combination of parts hereinafter described and claimed.

DESCRIPTION OF DRAWINGS

In the accompanying drawings which form part of the specification and wherein like numerals and letters refer to like parts wherever they occur.

DETAILED DESCRIPTION

Figure 1:
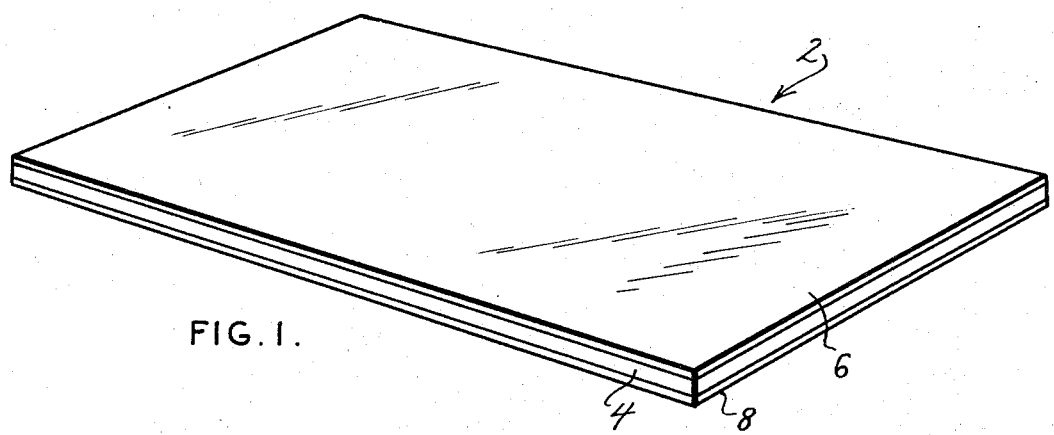
FIG. 1 is a perspective view showing a diffusion bonded transparent laminate constructed in accordance with and embodying the present invention.

Generally speaking, in the process of the present invention sheets of cast polymethyl methacrylate resin, commonly referred to as acrylic resin, are bonded to opposite surfaces of a sheet of polycarbonate resin through the application of pressure and heat to form a transparent laminate 2 of clad polycarbonate (FIG. 1). The bond is more easily effected when the heat and pressure are applied in an evacuated atmosphere. No intervening adhesives or other substances are required to create the bond, but on the contrary, it is a pure diffusion bond, sometimes termed a fusion bond. For reasons which will subsequently become more apparent, in most applications it is desirable to sandwich a sheet of polycarbonate between two sheets of acrylic in a single step bonding operation, so as to form a three layer laminate, although a single sheet of acrylic and single sheet of polycarbonate may also be bonded together through use of the same process.

More specifically, both surfaces of a single layer or sheet 4 of polycarbonate are cleaned with a solvent, such as isopropanol, to remove contaminants which might adversely affect the diffusion bonds to be formed at those surfaces. Other compatible solvents may also be used, but care must be exercised in selecting a solvent since polycarbonate reacts chemically with many of the commercial cleaning solvents currently available. Slight ridges in the surfaces of the polycarbonate sheet 4, the result of the extrusion process by which the sheet 4 was formed, need not be removed, and consequently polycarbonate sheets directly from the extruder may be employed. Once the surfaces of the sheet 4 are cleaned, the sheet 4 is dried at 257° F. ±5° for 24 hours for each ⅛ inch thickness of the sheet 4 to remove water therefrom. In other words, if the sheet 4 were ¼ inch thick it should be dried at 257° F for 48 hours. Once the polycarbonate sheet 4 is removed from the drying furnace it should either be carried forward immediately in the process and subjected to the actual bonding operation, or stored in a desiccator over calcium chloride to prevent it from reabsorbing water lost in the drying operation. If the final product, that is the laminate 2, will never be subject to temperatures in excess of the temperature at which polycarbonate bubbles internally, which is about 340° F., either during the fabrication process or in ultimate use, then the drying operation may be omitted since its sole purpose is to retard the formation of bubbles in the polycarbonate sheet 4 at high temperatures.

Two acrylic, that is cast polymethyl methacrylate, layers or sheets 6 and 8, which are equivalent in size to the polycarbonate sheet 4 insofar as surface dimensions are concerned but not necessarily thickness, are each cleaned on one of their surfaces with isopropanol or any other compatible solvent. Since acrylic is not nearly as reactive with solvents as polycarbonate, a much broader range of solvents is available. The acrylic sheets 6 and 8 need not be subjected to any drying operation.

The solvent cleaning of both the polycarbonate sheet 4 and the acrylic sheets 6 and 8 may be accomplished by wiping a cheese cloth dipped in isopropanol or some other solvent across the surfaces which must be freed of contaminants.

Figure 3:
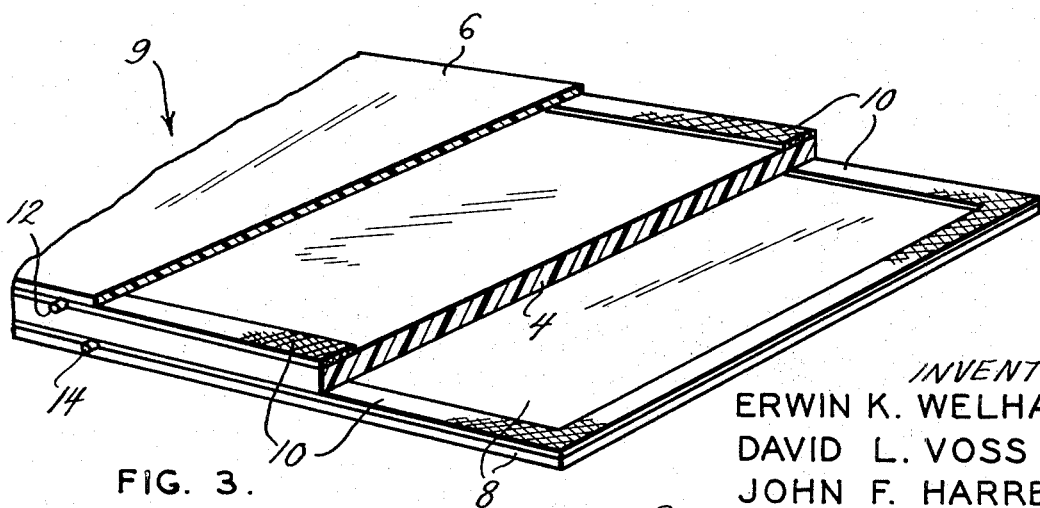
FIG. 3 is a fragmentary perspective view, partially broken away and in section, of the laminate.

Thereafter, the cleaned surfaces of the sheets 6 and 8 are brought against the cleaned surfaces of the sheet 4 in a formation of a loose stack 9 composed of the sheets 6, 4 and 8 arranged in that order with their margins in registration. Thus, the sheet 4 is in effect interposed between and protected by the sheets 6 and 8. As the sheets 6 and 8 are brought against the sheet 4 a narrow border or separating layer 10 of mesh material is fitted between sheets 6 and 4 and sheets 4 and 8 immediately inwardly from the outer edge of the stack 9 (FIG. 3). The mesh material of the border 10 may be aluminum mesh, glass cloth or any other type of material which will withstand elevated temperatures and not react with the acrylic or polycarbonate. The borders 10 separate the juxtaposed cleaned surfaces of the sheets 6, 4 and 8 at their edges, but nevertheless allow the center of the sheet 4 to contact the center of the sheet 8 and the center of the sheet 6 to contact the center of the sheet 4 when the stack 9 is compressed.

A pair of thermocouple junctions 12 and 14 are also interposed between cleaned surfaces of the sheets 4 and 6, respectively, adjacent to an outer edge of the stack 9 for ascertaining the temperatures at the interfaces subsequently formed between the sheets 6, 4 and 8.

Figure 2:
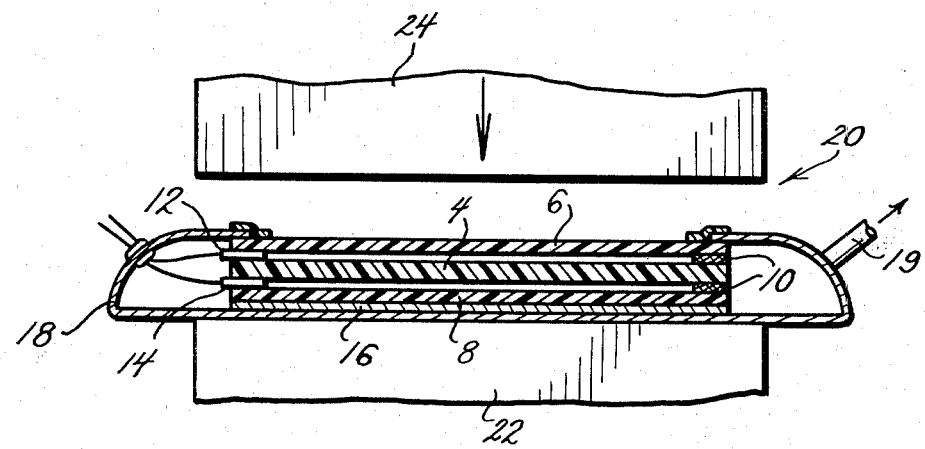
FIG. 2 is a side elevational view showing the individual layers of the laminate encapsulated in a vacuum bag and presented on a press for forcing them together.

Once the thermocouple junctions 12 and 14 are in place, a thin separating sheet 16 is slipped beneath the lower sheet 8. The composition of the sheet 16 is not critical as long as the material does not react with or adhere to whatever substance it bears against which in this case is acrylic. Mylar, a polyester marketed by DuPont, and stainless steel coated with a high temperature mold release agent have been found suitable for this purpose. Thereafter a flexible vacuum bag 18 (FIG. 2) is placed under the sheet 16 and drawn upwardly along the sides of the stack 9. The upper margin of the bag 12 is sealed against the upper surface of the sheet 8 adjacent to the outer margin thereof by means of sealing tape. Like the sheet 16, the composition of the bag 18 is not critical as long as it is compatible with polycarbonate and acrylic, and likewise the bag 18 may be formed from Mylar or stainless steel. The bag 18 possesses an evacuation port 19 which is connected with a vacuum pump (not shown).

With the bag 18 in position the stacked sheets 6, 4 and 8 and the separating sheet 16 encapsulated thereby are transferred to a press 20 having a fixed lower platen 22 on which the stack 9 rests and a movable upper platen 24 which may be moved toward the lower platen 22 for the purpose of compressing the sheets 6, 4 and 8 together. Both platens 22 and 24 contain means for heating them, and suitable controls are provided for precisely controlling the temperatures of the platens 22 and 24. The upper platin 24 is coated with a high temperature mold release agent. To avoid excessive marring of the outwardly presented surfaces on the acrylic sheets 4 and 6 both the coated surfaces of the stainless steel sheet 16 and the upper platen 24 should be polished. While polished surfaces of the foregoing nature are desirable, they are not absolutely necessary since scratches and mars can be easily removed from acrylic by a simple polishing operation.

When the stacked and bagged sheets 6, 4 and 8 are in position on the lower platen 22 of the press 20, a vacuum is drawn in the bag 18 through its evacuation port 19 to remove the air from between the sheets 6, 4 and 8 which are initially separated, at least at their edges, by the border 10 of mesh material. The vacuum should be between 25 and 30 inches of mercury, and should be held for at least 15 minutes before proceeding with subsequent operations. Once the vacuum is induced in the bag 18 the pressure of the atmosphere will force the sheet 6 downwardly and in most instances will cause the centers of the juxtaposed sheets 6, 4 and 8 to contact one another.

After the 15 minute period and with the vacuum still applied, the upper platen 24 is lowered against the upper surface of the acrylic sheet 6 and compressed against the stack 9 until the average pressure within the stack 9 is less than 1000 p.s.i. Best results are obtained with a pressure in the neighborhood of 200 p.s.i. Thereafter the temperature of the platen 22 and 24 is raised until the temperature at the interfaces between the sheets 6, 4 and 8 is between 200° F. and 400° F. Those temperatures are, of course, determined at the thermocouple junctions 12 and 14. The elevated temperature and pressure are held between ½ minute and 60 minutes, and during this period the acrylic sheets 6 and 8 are diffusion bonded to the polycarbonate sheet 4 in the formation of the transparent laminate 2. Generally speaking, the bonding pressure necessary to produce the diffusion bond decreases as the temperature at the interface between the sheets increases. However, at high temperatures the acrylic is pliable, and one runs the risk of impairing its optical qualities even when the slightest amount of pressure is applied. For this reason optimum results are obtained when the temperature is raised to slightly above 300° F.

The narrow mesh borders 10 hold the sheets 6, 4 and 8 apart at their outer edges so that as the pressure is increased the area of actual contact expands from the center outwardly. Thus, the presence of the borders 10 prevents air pockets or bubbles from being trapped and sealed between the sheets 6, 4 and 8. The borders 10 in time embed completely within the sheets 6, 4 and 8. When the platen 24 is withdrawn, the rough laminate 2 comprising the diffusion bonded sheets 6, 4 and 8 with the borders 10 therein, is removed, and the portion containing the embedded mesh borders 10 is cut off, leaving the laminate 2 with no internal obstructions. Thereafter, the exposed edges of the sheet 4 may be sealed to prevent the polycarbonate from reabsorbing moisture through them, and the outer surfaces of the laminate 2, which are actually the exposed surfaces of the acrylic layers 6 and 8, are polished to remove any blemishes or scars therefrom. The final product is a transparent laminate 2 or clad polycarbonate having excellent optical characteristics and composed of nothing more than a pair of acrylic layers bonded to an intervening polycarbonate layer.

The acrylic sheets 6 and 8 may also be bonded to the polycarbonate sheet 4 without evacuating the surrounding atmosphere, in which case the bag 18 and the separating sheet 16 are eliminated, and the lower platen 22 bears directly against the sheet 6. Again a high temperature mold release agent must be used on the surface of the platen 8. The temperature and time duration of the heat and pressure application are substantially the same as when a vacuum is introduced into the bonding process, but the pressure exerted must be somewhat higher. Indeed, pressures up to approximately 1000 p.s.i. must be employed to achieve adequate bonding in the absence of a vacuum or evacuated atmosphere. When the vacuum bag 18 is eliminated the borders 10 may also be eliminated.

The bonding pressure may be applied by means other than the press 20. For example, autoclaves are ideally suited for compressing the sheets 6 and 8 against the sheet 4. A two sheet transparent laminate composed of one acrylic and one polycarbonate sheet may also be produced in the foregoing process, and where a vacuum is employed in that process the sheet 16 should be against the acrylic sheet and the bag should be taped to the outer surface of the polycarbonate sheet. Where only two sheets are bonded, care must be exercised not to scratch or otherwise mar the exposed surface of the polycarbonate sheet since mars in such surfaces are not easily removed.

The transparent laminate 2, fabricated in accordance with the foregoing process, has substantially all of the advantages associated with acrylic and polycarbonate individually, but does not inherit the disadvantages. For example, the laminate 2 possesses the shatter resistant characteristics of polycarbonate since it actually contains a polycarbonate core, yet it can be easily ridded of scratches since its exposed surfaces are composed of acrylic. In other words, the acrylic layers 6 and 8 protect the delicate surface of the polycarbonate layer 4, while the polycarbonate layer 4 lends heat rigidity and shatter resistance to the acrylic layers 6 and 8. In this same vein, the relatively inert acrylic layers 6 and 8 protect the reactive polycarbonate layer 4 from solvents and other substances which would impair optical qualities of the layer 4 if allowed to contact it. The extrusion marks left on the polycarbonate sheet 4 when it was extruded merely blend or embed into the acrylic sheets 6 and 8, and since the index of refraction for both acrylic and polycarbonate is practically the same, the distortion caused by the extrusion ridges is indiscernible and does not impair the optical qualities of the laminate 2. Thus, the polycarbonate sheet 4 prior to use in the foregoing process need not be compressed between smooth platens to remove the extrusion ridges.

Since the bond formed is a diffusion bond and does not rely on intervening layers of adhesives and other bonding agents, the optical qualities of the laminate 2 equal those of acrylic and polycarbonate.

Laminates 2 are particularly suited for use in high performance aircraft where high skin temperatures in the neighborhood of 350° F.–400° F. are often encountered. In such a situation a temperature gradient exists across the laminate 2 from the exterior of the craft to the interior of its cockpit or cabin. For example, the exterior of a cockpit canopy formed from the laminate may be 380° F. due to the air friction induced by high speed flight, whereas the interior may be at 180° F.—a 200° F. gradient. Notwithstanding the composite nature of the laminate 2, this gradient is for all practical purposes linear across the entire thickness of the laminate. With the foregoing example and considerations in mind, the outermost acrylic layer 6, that is the one exposed to the high temperature need only be $$\frac{380-340}{200}$$

or ⅕ of the total thickness of the laminate 2 to reduce the highest temperature in the polycarbonate layer below 340° F., the temperature at which polycarbonate bubbles internally. Thus, the outermost acrylic layer 6 serves as a heat shield for protecting the polycarbonate layer 4. Of course, structural characteristics of polycarbonate, in addition to the bubbling phenomenon must be considered in calculating the thickness of the various layers 4, 6 and 8. For example, the load on the windshield of an aircraft flying at Mach 2.0 and at 40,000 feet amounts to about 8 p.s.i. applied inwardly. This figure represents the resultant of the external wind load and the internal cockpit pressurization. At the skin temperatures associated with such speeds the outer acrylic layer 6 remains intact but is ineffectual as a load carrying structure due to the high temperature it attains. The wind load is carried by the cooler regions of the polycarbonate layer 4, and accordingly a sufficient thickness of the polycarbonate must be present to carry the wind load applied against the laminate 2 at the temperature gradient existing within it. Since polycarbonate retains much strength even at temperatures in the neighborhood of 300° F. the layer 4 need not be very thick to carry the entire 8 p.s.i. resultant load. Acrylic, as previously noted, does not possess much strength at those temperatures, and therefore must have a substantial cross-section in the low temperature area of the gradient in order for a canopy made exclusively from it to remain structurally sound.

In aircraft canopies the innermost layer 8 of acrylic merely serves as a protective coating for the inwardly presented surface of the polycarbonate layer 4, and does not function as a heat shield as is true of the outer acrylic layer 6. Therefore, the thickness of the innermost acrylic layer 8 is not critical, and to take advantage of the more desirable structural properties of the polycarbonate layer 4, the acrylic layer 8 is made quite thin.

Ultraviolet light stabilizers for shielding the interior of the cockpit from excessive ultraviolet radiation are introduced into the acrylic layer 6. Since such stabilizers do not significantly affect the light transmitting characteristics of acrylic, they do not affect the light transmitting characteristics of the laminate 2, either.

EXAMPLE 1

An extruded sheet 4 of Lexan polycarbonate 0.25 inch thick was cleaned on both surfaces with isopropanol and then dried at 257° F. for 48 hours. The slight ridges formed in the surface of the sheet 4 by the extrusion process were not removed. Prior to removal of the polycarbonate sheet 4 from the drying furnace, two sheets 6 and 8 of Plexiglas II were each cleaned on one surface by wiping with isopropanol, also. Lexan polycarbonate is marketed by the General Electric Company, whereas Plexiglas II is a cast acrylic polymer marketed by Rohm and Haas.

With the cleaned surface of the sheet 8 presented upwardly a ¼ inch wide border or border 10 of Type 1000 glass cloth was laid upon it adjacent its edge. Similarly, another border 10 of Type 1000 glass cloth ¼ inch wide was deposited on the upper cleaned surface of the polycarbonate sheet 4, and the acrylic sheet 6 was, in turn, laid across the sheet 4 and border 10 upon it. Thereafter, the thermocouple junctions 12 and 14 were placed between the sheets 6, 4 and 8 at one common edge and the highly polished sheet 16 of thin stainless steel was coated with a high temperature mold release agent and placed under the sheet 8 with its coated surface against the lower surface of the sheet 8. The entire stack of sheets 6, 4, 8 and 16 was then encapsulated in a Mylar vacuum bag 18 and the margin of the bag 18 was sealed against the upper surface of the sheet 6 adjacent its border by means of extruded sealing tape, Type 582.

The entire stack and the vacuum bag 18 encapsulating it were then moved to the lower platen 22 of the press 20, the upper platen 24 of which had also been coated with a high temperature mold release agent.

Next, the interior of the bag 18 was placed under a vacuum of 27 inches of mercury. At the expiration of 15 minutes from the time the vacuum was first applied, and with the vacuum still in effect the upper platen 24 was lowered and compressed against the sheet 8 until the average compressive pressure on the stacked sheets 6, 4 and 8 amounted to 200 p.s.i. At that point the pressure was held constant and the temperature at the interfaces between the sheets 6, 4 and 8 was elevated to 320° F. by raising the temperature of the platens 22 and 24. These temperature and pressure conditions were maintained for 10 minutes.

Thereafter the upper platen 24 was withdrawn and the bag 18 was removed. The sheets 6 and 8 were no longer free of the sheet 4 but were, on the contrary, bonded securely to it. Next, the embedded border 10 of glass cloth was cut away, leaving the transparent laminate 2. Finally, the edges of the sheet 4 were then sealed, and the surfaces of the layers 6 and 8 were polished to remove any mars or scratches.

The laminate 2 so formed exhibited good optical qualities and the bond proved extremely strong.

EXAMPLE 2

Plexiglas 55, a cross linked acrylic also marketed by Rohm and Haas, was bonded to Lexan polycarbonate employing the same techniques as in Example 1, except that a layer of Plexiglas II, that is a cast acrylic, was first bonded to the polycarbonate. The layers of polycarbonate, Plexiglas II and Plexiglas 55 may also be bonded together simultaneously with the Plexiglas II interposed between the Plexiglas 55 and the polycarbonate.

This invention is intended to cover all changes and modifications of the example of the invention herein chosen for purposes of the disclosure which do not constitute departures from the spirit and scope of the invention.

What is claimed is:

1. A transparent laminate article comprising a layer of polycarbonate resin and a layer of cast polymethyl methacrylate resin having a first surface in direct contact with a surface of the layer of polycarbonate resin and diffusion bonded to the polycarbonate resin at that surface, said contacting surfaces being clean prior to bonding, the polymethyl methacrylate having a second surface which is an outer exposed surface of said laminate article.

2. A transparent laminate according to claim 1 and further characterized by another layer of cast polymethyl methacrylate resin diffusion bonded to the opposite surface of the polycarbonate layer, whereby the polycarbonate layer is interposed between two cast polymethyl methacrylate layers.

3. A transparent laminate according to claim 1 wherein the cast polymethyl methacrylate layer contains an ultraviolet light stabilizer.

4. A transparent laminate according to claim 1 wherein the surfaces of the polycarbonate layer which are not diffusion bonded to the cast polymethyl methacrylate are sealed to prevent the polycarbonate from absorbing moisture through those surfaces.

References Cited
UNITED STATES PATENTS

| | | | |
|---|---|---|---|
| 3,573,150 | 3/1971 | Broutman et al. | 161—55 |
| 3,594,264 | 7/1971 | Urban | 161—252 X |
| 3,661,685 | 5/1972 | Osteen | 161—183 X |
| 3,520,768 | 7/1970 | Peilstocker et al. | 161—183 X |
| 2,444,976 | 7/1948 | Brown | 161—408 X |
| 2,774,697 | 12/1956 | Koblitz | 161—183 X |
| 2,787,568 | 4/1957 | Koblitz | 161—183 |
| 3,234,062 | 2/1966 | Morris | 156—104 |
| 3,420,679 | 1/1969 | Gifford et al. | 161—183 X |
| 3,249,479 | 5/1966 | Boicey | 156—104 X |
| 3,281,296 | 10/1966 | Jameson | 156—104 |
| 3,388,034 | 6/1968 | McCombie | 161—183 |
| 3,388,035 | 6/1968 | Mattimoe et al. | 161—183 |
| 3,403,071 | 9/1968 | Perry et al. | 161—408 X |
| 3,406,086 | 10/1968 | Foster | 161—183 |

HAROLD ANSHER, Primary Examiner

U.S. Cl. X.R.

156—104, 306; 161—188, 252, 408, 409